Sept. 22, 1959     G. L. TRANDEL     2,905,490
FEATHER KEY
Filed May 12, 1954
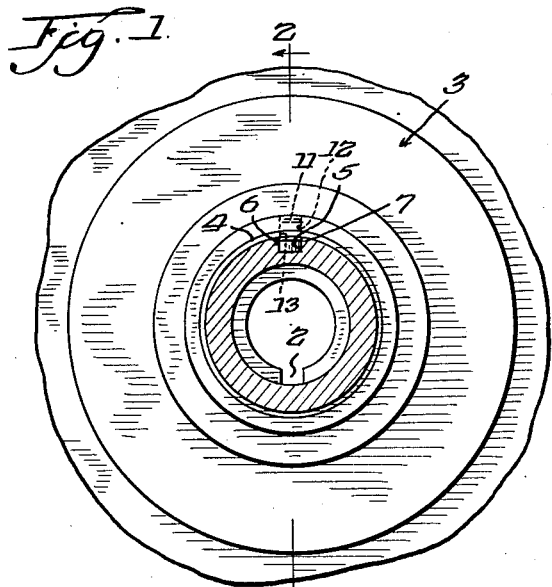
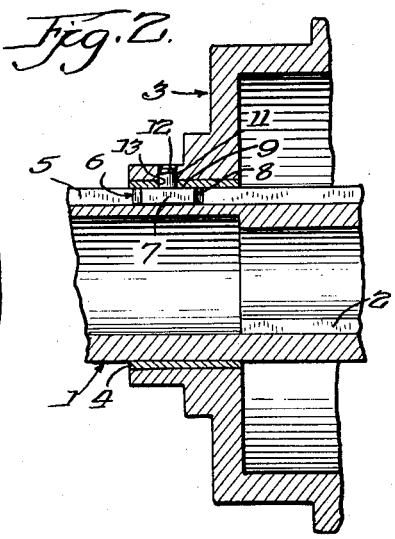
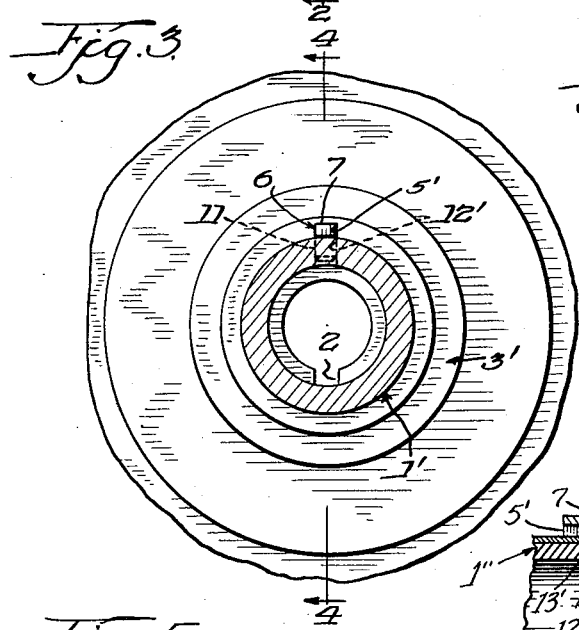
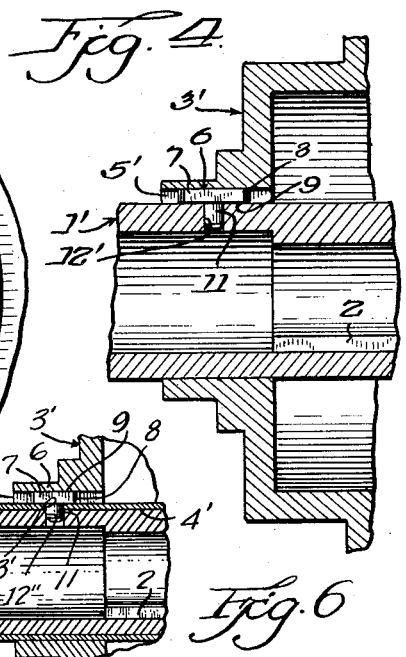
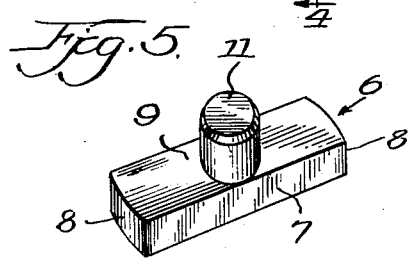
Inventor:
George L. Trandel,
By Hiee & Hiee Attys.

United States Patent Office 2,905,490
Patented Sept. 22, 1959

2,905,490

FEATHER KEY

George L. Trandel, Northbrook, Ill., assignor to Gerbing Manufacturing Corporation, Northbrook, Ill., a corporation of Illinois Application May 12, 1954, Serial No. 429,246

1 Claim. (Cl. 287—52)

The invention relates generally to a key structure and more particularly to a feather key structure whereby two members may be connected for transmission of torque stresses from one to the other and at the same time permit relative axial movement between the members.

The present invention has among its objects the production of a feather key construction which is self-aligning, requiring only one key-way, whereby an exceedingly simple and inexpensive structure may be employed having high efficiency for the purposes intended.

Another object of the invention is the production of a feather key structure which facilities the use of a thin walled bushing on one of the members, with the key being of one piece construction and effectively locking a pair of members together, including such a thin walled bushing.

A further object of the invention is the production of such a feather key structure which requires a minimum of machining or other manufacturing operations in or on the elements to be connected thereby, as well as eliminate close tolerances in the cooperating, interlocking elements on the respective members.

Many other objects and advantages of the construction herein shown and described will be obvious to those skilled in the art from the disclosure herein given.

To this end my invention consists in the novel construction, arrangement and combination of parts herein shown and described, and more particularly pointed out in the claim.

In the drawings, wherein like reference characters indicate like or corresponding parts:

Fig. 1 is an end elevation of a hub member connected to a hollow shaft by a key member constructed in accordance with the present invention;

Fig. 2 is a sectional view of the structure illustrated in Fig. 1, taken approximately on the line 2—2 of Fig. 1;

Fig. 3 is a view similar to Fig. 1 illustrating a reversal in assembly of the key structure;

Fig. 4 is a sectional view taken approximately on the line 4—4 of Fig. 1;

Fig. 5 is a perspective view of the key member employed in the constructions illustrated in Figs. 1 through 4; and, Fig. 6 is a partial sectional view of a modification similar to Fig. 4 but wherein a thin walled bushing is assembled to the shaft member.

The present invention contemplates the utilization of a key member having a portion adapted to be positioned in a key-way slot or channel in one of the members to be connected and having an integral stem adapted to be positioned in a bore in the other member to be connected, the construction being such that the key member is free to pivot about the stem whereby the key member is automatically self-aligning with the key-way channel. Where it is desired to utilize a thin walled bushing in or on one of the members, the stem of the key may be readily extended through an aperture in the bushing and into the member associated therewith, thereby effectively keying the members together and at the same time retaining maximum strength and bearing surface of the bushing.

Referring to the drawings, and particularly Figs. 1 and 2, reference numeral 1 indicates generally a portion of a shaft, illustrated as being of hollow construction, provided with an internal key-way 2, by means of which the shaft may be connected to a suitable driving or driven shaft, this construction being similar to some forms of pulley structures, particularly those of a variable pitch construction. Carried by the shaft 1 is a member indicated generally by the numeral 3, which by way of example may be a hub of a pulley or other similar member. In the construction illustrated in Fig. 1, the hub 3 is provided with a suitable bushing 4, illustrated as being of the thin walled type, with the hub and bushing being mounted for axial movement relative to the shaft 1.

As clearly illustrated in Fig. 1, the shaft 1 is provided in its outer periphery with a key-way channel or slot 5, the latter extending parallel to the axis of the shaft. Positioned in the key-way 5 is a feather key indicated generally by the numeral 6, which as illustrated in Fig. 5, comprises a body portion 7, the width of the body portion 7 being slightly less than the corresponding key-way 5 to provide a reasonably snug fit and at the same time permit the key 6 to slide within the key-way. In the construction illustrated, the length of the body portion 7 is several times the width thereof to eliminate any tendency of the key to bind in the channel, and the end faces 8 of the body portion may be suitably curved to facilitate insertion of the key as well as tending to relieve the sharp corners at the juncture of the end face with the side edges of the body portion.

Extending outwardly from the face 9 is a stem 11 which is of cylindrical shape and integrally formed with the body portion 7, the diameter of the stem 11 in the embodiment of the invention illustrated being substantially equal to the width of the body portion 7 with the axis of the stem extending perpendicular to the bottom face of the latter. Likewise, the axes of curvature of the end faces 8 may extend in the same general direction as the axis of the stem. The cylindrical stem 11 is positioned in a bore 12 in the member 3 and a like bore 13 in the sleeve 4, with the diameter of such bores being of a size to snugly receive the stem 11 and at the same time permit a slight degree of pivotal movement of the key about the axis of the stem.

It will be noted that with this construction the shaft 1 is rigidly connected through the key member 6 to the member 3 insofar as torque stresses between the two are concerned, at the same time permitting axial movement of the member 3 relative to the shaft. It will also be apparent that the present construction does not require any particular positioning of the bore 12 with respect to the key-way 5 in the shaft as compared, for example, with constructions involving key-ways in each of the members, in which case the respective key-ways must extend in substantially exact parallelism with respect to each other in the absence of which binding will occur when axial movement between the shaft and the member carried thereby is effected. However, in fabricating the present construction, satisfactory alignment of the axes of the bores 12 and 13 with respect to the axis of the key-way may be readily achieved, the construction requiring no particular positioning or locating of the bore on the hub 3. Obviously the operation of boring or otherwise forming the bore 12 in the desired relationship is a simple one as compared with insuring alignment of two channels or key-ways, etc.

In assembling the structure, the stem 11 of the key may be inserted into the bushing, and the shaft suitably rotated to permit entry of the body portion 7 into the key-way 5, and obviously may be disassembled in the reverse order.

It will be apparent that with this construction a thin walled bushing such as the bushing 4 may be readily employed, at the same time retaining an effective interlocking between the shaft and the hub member, with only a single hole or opening being formed in the bushing so that no channel in the bushing is required nor is it necessary to slit the bushing. The key 6 is free to pivot about the axis of the stem 11 at all times, resulting in an accurate alignment in the key-way 5 throughout any relative travel between the hub member 3 and the shaft 1, eliminating any tendency of the key to bind in the shaft. It will also be appreciated that the structure is exceedingly simple, employing only a single key-way in one member and a small bore in the other member, and where a bushing is employed, if desired, the bores 12 and 13 may be simultaneously formed in a single operation.

The construction illustrated in Figs. 3 and 4 is similar to that disclosed in Figs. 1 and 2, and illustrates the application of the invention to a similar shaft and hub wherein the key-way channel is formed in the hub member. In this construction the hub 3' is provided with a key-way channel 5' and the shaft 1' is provided with a bore 12'. The same key 6 may be employed, the body portion 7 of the key being positioned in the channel 5' and the stem 11 being positioned in the bore 12'. This construction may be advantageous where for some reason or other it is not desired to form a key-way in the shaft itself, as for example where the shaft is thin walled and insufficient material is provided to receive a key-way, or the shaft member is provided with a sleeve similar to the bushing 4.

The construction illustrated in Fig. 6 is similar to that disclosed in Figs. 3 and 4, and illustrates the application of the invention to a similar shaft and hub wherein the key-way channel is formed in the hub member but a sleeve 4' is provided for the shaft member 1". In the construction of Fig. 6 as in Fig. 4, the hub 3' is provided with a key-way channel 5' and the shaft 1" is provided with a bore 12". The same key-way 6 may be employed, the body portion 7 of the feather key being positioned in the channel 5' and the stem 11 being positioned in the bore 12". A similar bore 13' in the sleeve 4' is in alignment with the bore 12" and the stem 11 of the feather key extends within the aligned bores 12" and 13', satisfactory alignment of the axes of the bores 12" and 13' with respect to the axis of the key-way channel 5' being readily achieved.

It will be noted that in either event the structures provide self-alignment of the key in the channel and the other advantages heretofore referred to. In some cases it may be desirable to employ a plurality of keys 6 rather than one, in which case all of the key-ways may be in one member or may be divided with each member having one or more key-ways.

It will be noted from the above description that I have provided a very simple yet efficient feather key construction and assembly having a minimum number of parts and which incorporates self-equalization of self-alignment.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

In a torque transmitting structure, the combination of a shaft member, a hub member through which said shaft member extends, said shaft member and hub member being axially slidable with respect to each other, one of said members having a key-way channel of generally rectangular cross-section in the abutting face thereof, said key-way channel extending parallel to the axis of rotation of said members, the other member having a radial bore therein, the axis of said radial bore intersecting said key-way channel in the operative torque transmitting position of said shaft member and hub member, the width of the key-way channel being substantially equal to the diameter of said radially extending bore, a relatively thin wall bearing sleeve operatively interposed between said members and having a bore in the side wall thereof of approximately the same diameter as said radially extending bore and axially aligned therewith, and a feather key comprising a body portion of complementary size positioned in said key-way channel and a cylindrical stem portion the diameter of which is substantially equal to the width of said body portion and being complementary to and received in said bores, said cylindrical stem portion permitting swiveling of said feather key for alignment of the body portion thereof within the key-way channel, whereby torque may be transmitted from the one member through said feather key to the other member with said hub member being slidable axially along said shaft, and said bearing sleeve and feather key being slidable with the member having said radially extending bore therein.

References Cited in the file of this patent

UNITED STATES PATENTS

| | | |
|---|---|---|
| 173,716 | Crawford | Feb. 22, 1876 |
| 313,711 | Corser | Mar. 10, 1885 |
| 1,221,709 | Dyett | Apr. 3, 1917 |
| 1,391,728 | Fisher | Sept. 27, 1921 |
| 1,580,190 | Davies | Apr. 13, 1926 |
| 1,604,423 | Rosewood | Oct. 26, 1926 |
| 1,886,128 | Small | Nov. 1, 1932 |
| 2,434,935 | Kroon | Jan. 27, 1948 |
| 2,535,382 | Bachli et al. | Dec. 26, 1950 |